J. W. Rutter.
Ore Mill.

No. 3,633. Reissued Sept. 7, 1869.

Witnesses:
F. M. Coombs
Fred. Haynes

Inventor:
J. W. Rutter
by Brown & Coombs Ca.
Attys.

BEST AVAILABLE COPY

BEST AVAILABLE COPY

United States Patent Office.

JAMES W. RUTTER, OF ST. LOUIS, MISSOURI.

*Letters Patent No. 88,216, dated March 23, 1869; reissue No. 3,633, dated September 7, 1869.*

IMPROVEMENT IN ORE-CRUSHERS

The Schedule referred to in these Letters Patent and making part of the same.

*To all whom it may concern:*

Be it known that I, JAMES W. RUTTER, of St. Louis, in the county of St. Louis, and State of Missouri, have invented a new and improved "Crushing and Grinding-Machine;" and I do hereby declare that the following is a full, clear, and exact description of the same, reference being had to the accompanying drawing, forming a part of this specification, and in which—

Figure 1:
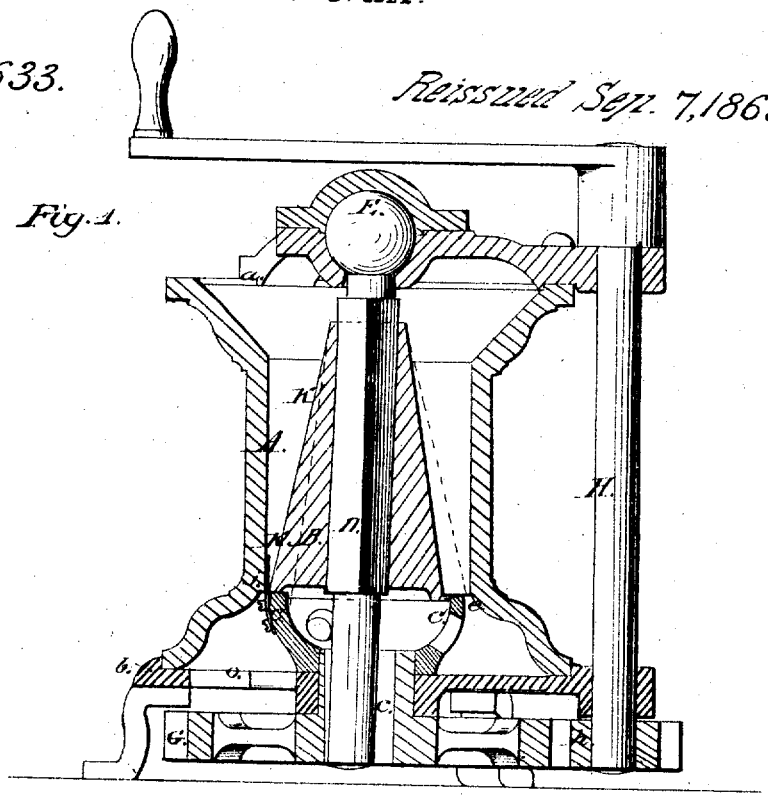
Figure 2:
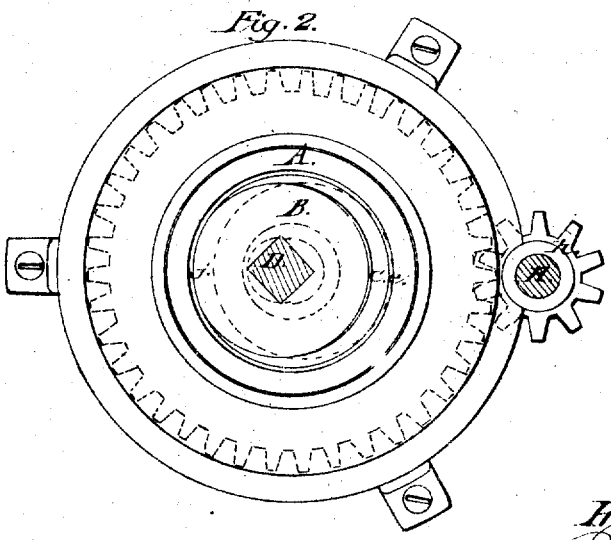

Figure 1 represents a sectional elevation of a crushing and grinding-machine, constructed according to my improvement; and Figure 2 represents a horizontal section of the same, taken through the line *x x* in fig. 1.

Similar letters of reference indicate corresponding parts in both figures.

The invention relates to that class of crushing and grinding-machines in which a conical grinder or crusher, with concentric and eccentric bearings, is operated within a stationary upright cylinder or chamber, or in which the crushing-chamber is made conical, and the crusher straight; and The invention consists in a universal or ball-and-socket support above the cylinder, from which the crushing-cone is suspended on an oscillating arbor, rigidly connected with a rotating eccentric box carrying its lower extremity, and which is fitted in the hub of a horizontal gear-wheel, so as to rotate, in an annular conical orbit, within said gear-wheel, but having no rotation on its own axis, whereby a grinding or rubbing-action, as well as a crushing effect, is produced, instead of a crushing-action only, as in similar machines, wherein the cone rotates around its own axis; also, in the combination with such crusher and its cylinder or chamber, of a gauge-ring, of novel character, whereby ore, or other material to be crushed or ground, when placed within the cylinder, is checked in its descent, and prevented from passing out until it has been sufficiently reduced by the action of the crusher; and furthermore, in the combination with such gauge-ring and cylinder, of a stripper or clearer, to remove any adhering substance from said cylinder.

In order that others may understand the construction and operation of my invention, I will proceed to describe, with reference to the drawing.

A is a hollow cylinder, constructed of cast-iron, or other metal, with enlarged upper and lower extremities, and arranged in a vertical position, resting upon a horizontal base, *b*.

B is a crusher and grinder, of conical or tapering form, and secured to an oscillating arbor, D, suspended from the cap of the cylinder by means of a universal ball-and-socket joint, E, and is made to swing in a conical orbit around the axis of the cylinder, by the rotating of an eccentric-box, C, carrying the lower extremity of the arbor D, and fitted in the hub of a horizontal gear-wheel, G, arranged under the base-plate *b*, and driven by a pinion, *h*, of a suitably-arranged countershaft, H.

C is a gauge-ring, constructed of iron, or other metal, and, preferably, of a form as represented in the drawing, but may be of any suitable form for effecting the purpose for which it is designed Said gauge-ring C is carried upon the upper extremity of the hub of the said gear-wheel G, with its upper surface fitting against the under surface of the grinder B, and serves to prevent the downward escape of the material before it has been sufficiently reduced, but permits the ready escape of said material after it has been sufficiently reduced, by means of an annular space, *e*, left between its outer edge and the inner surface of the cylinder, and, as it turns with the hub, it also serves, to some extent, as a distributer, changing the position and locality of the lumps or particles of the material at the bottom, and thus presenting new surfaces thereof to the action of the crusher.

Said gauge-ring C is, or may be, provided with a clearer or stripper, *j*. Said clearer or stripper *j* is constructed of steel, or other suitable metal, and is so arranged as, by the rotating of said gauge-ring C, to scrape against the inner surface of the lower part of the cylinder A, immediately behind the point where the material is being subjected to the greatest crushing-action of the grinder B, thereby to scrape off and to prevent the adhering of the material to the said surface.

This stripper or clearer is unnecessary, except in grinding such material as is liable to adhere to the cylinder when in a crushed or powdered state Suitable openings, *a a*, are made in the cap, for insertion of the material to be crushed or ground; and, also, similar openings, *o o*, are made through the base-plate *b* and gearing-wheel G, for the downward passage of the said material, after it has been crushed or ground.

Motion is imparted to the shaft H by any suitable application of power, and the material fed in at the top gradually works its way downward by action of gravity, as in other vertical crushers or grinding-machines.

It will be evident that if a piece of ore, or a rock, or other material, be placed in the cylinder, while the crusher B is in the position indicated by the red lines, it will, by the motion of said crusher, be subjected to a crushing and grinding-force, and will be more or less reduced, according to the locality it occupies in the cylinder. If near the top, as at K′, it will be broken into two or more pieces; but if it be small enough to lie near the bottom, as at K, it will be reduced to gravel or to powder, its fineness depending upon the adjustment at which the eccentric-box *c* and gauge-ring C are set.

In this arrangement, the crusher B does not rotate on its axis. The ore, or other material descends, as its lumps or particles are reduced, until it reaches the face of the gauge-ring C, where it is checked in its downward motion, and moved round with the said gauge-ring, by the friction of its surface, until said lumps or particles, by being subjected to the repeated crushing and grinding-action of the crusher, become sufficiently reduced to drop through the annular space *e*.

The crushing-chamber A need not necessarily be of cylindrical form on its inside, but of polygonal or varied configuration, and may be made tapering or conical, instead of the crusher B, which may be made straight.

Different constructions, also, may be adopted for feed and delivery of the material to and from the mill or machine; also, additional grinding-surfaces or plates, if necessary, may be arranged below the crusher, for further reducing or finely powdering the crushed and ground material.

A mill or machine constructed upon this principle, is applicable to crushing and grinding substances of various kinds, both coarse and fine, including rock, ore, grain, &c.

What I claim as my invention, and desire to have secured by Letters Patent, is—

1. The cone B on the arbor D, when sustained and operated in such manner as to swing in a conical orbit around the axis of its surrounding cylinder, without rotating around said arbor, substantially as set forth.

2. The gauge-ring C, arranged and operating in combination with the cylinder A, and crusher or grinder B, substantially as and for the purposes herein set forth.

3. The combination, with the gauge-ring C and cylinder A, of the stripper or clearer *j*, substantially as and for the purpose herein set forth.

JAS. W. RUTTER.

Witnesses:

C. G. BENTLEY,

G. W. FORBES.